United States Patent Office 3,585,721
Patented June 22, 1971

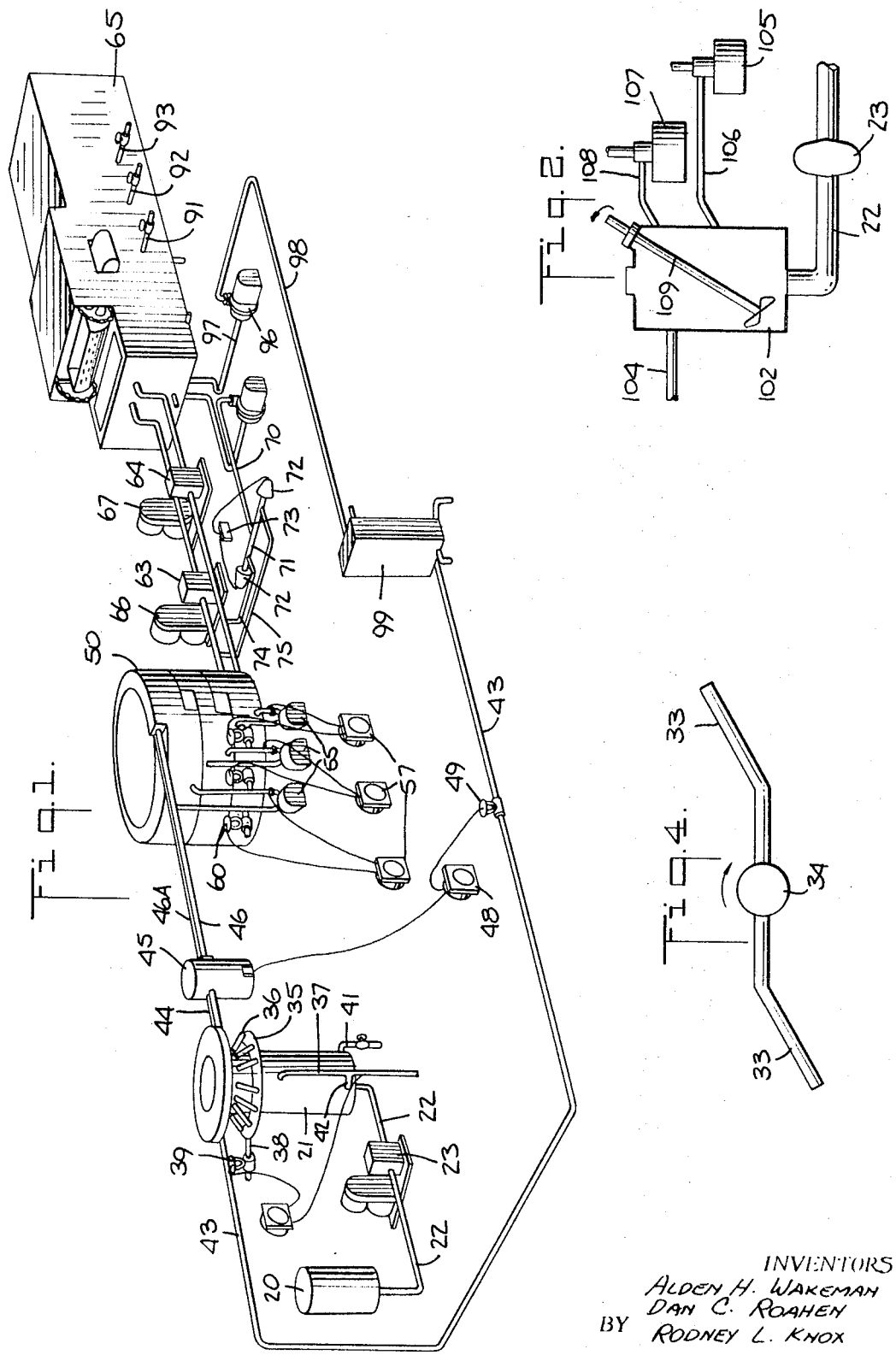

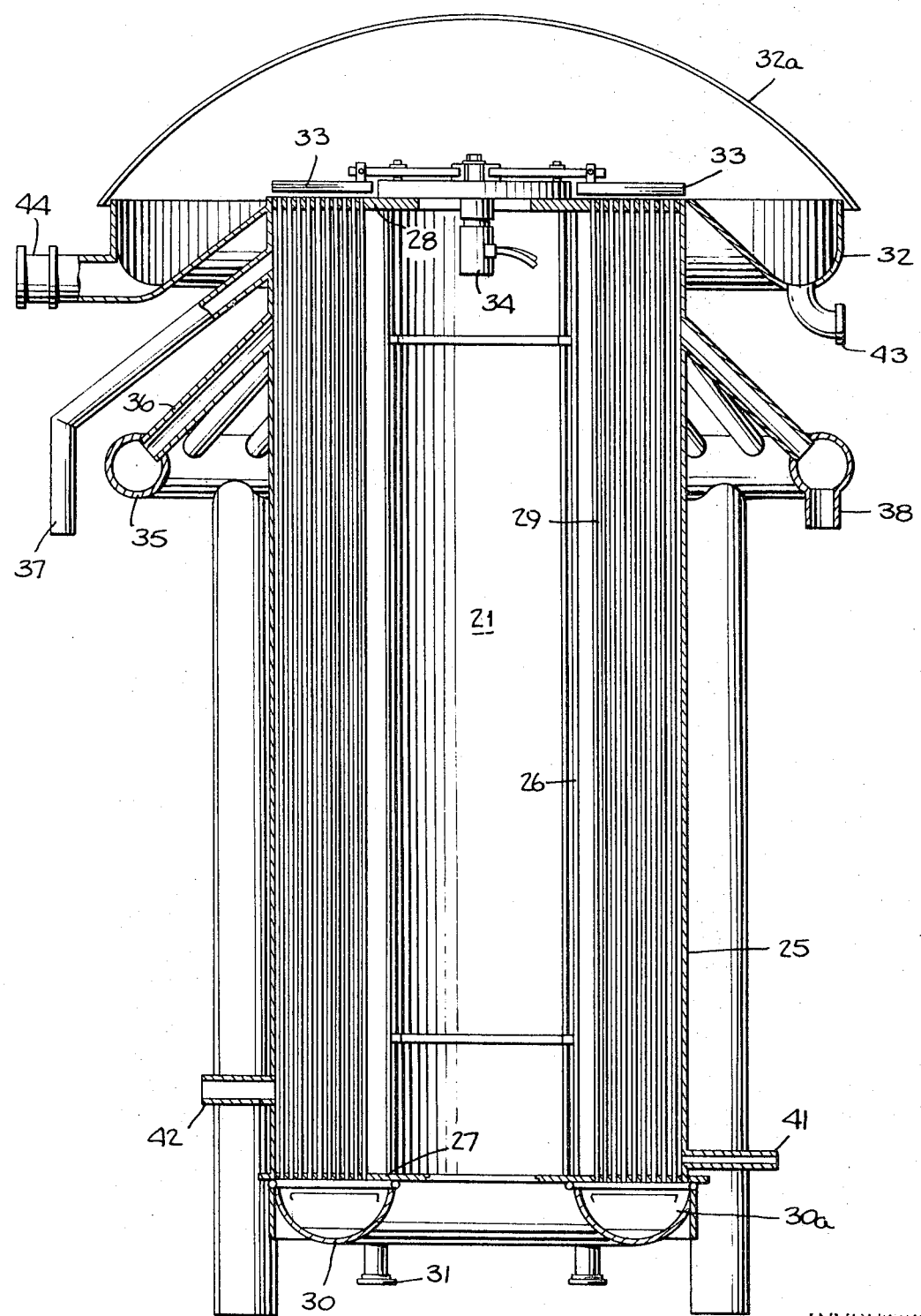

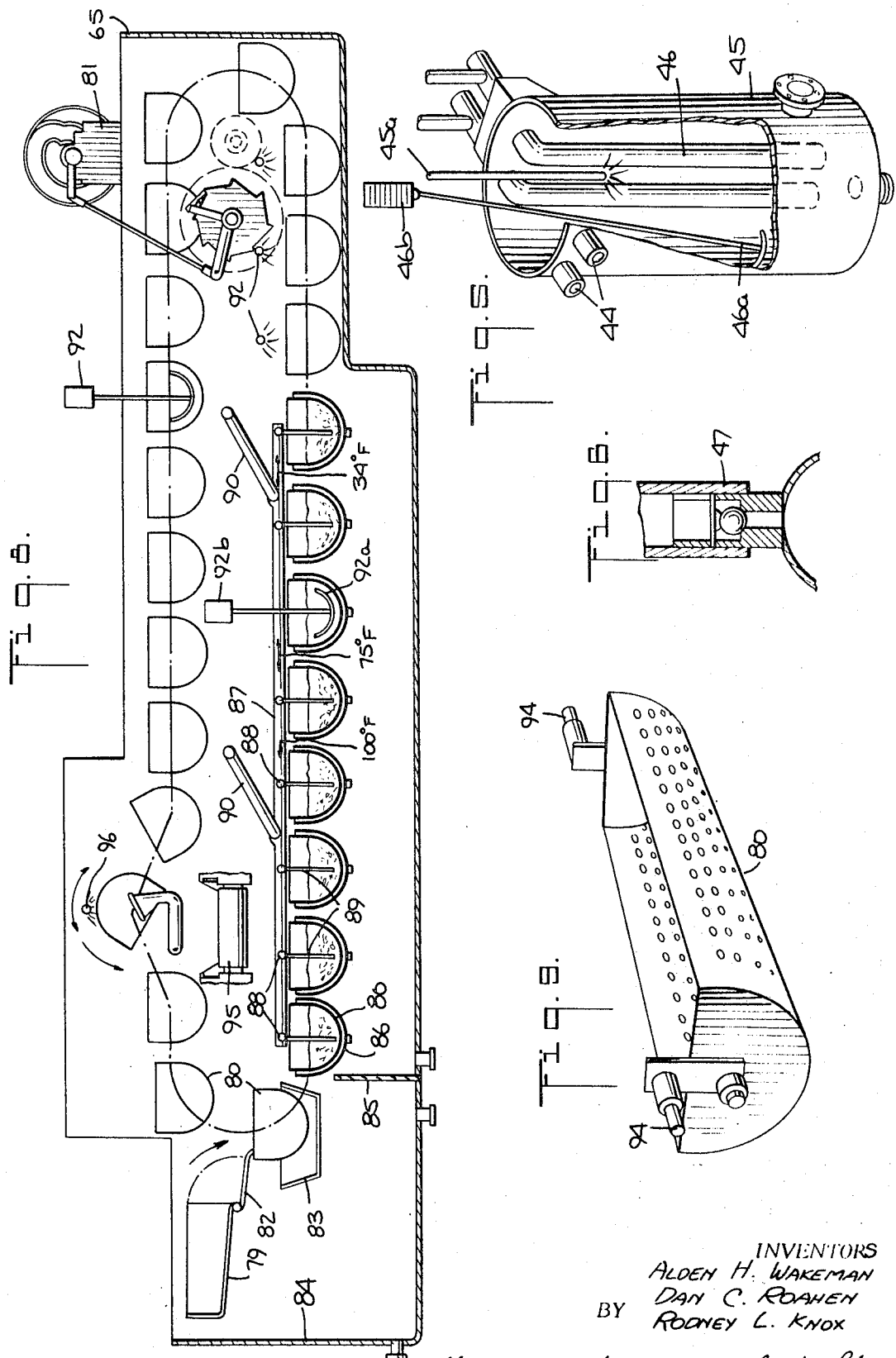

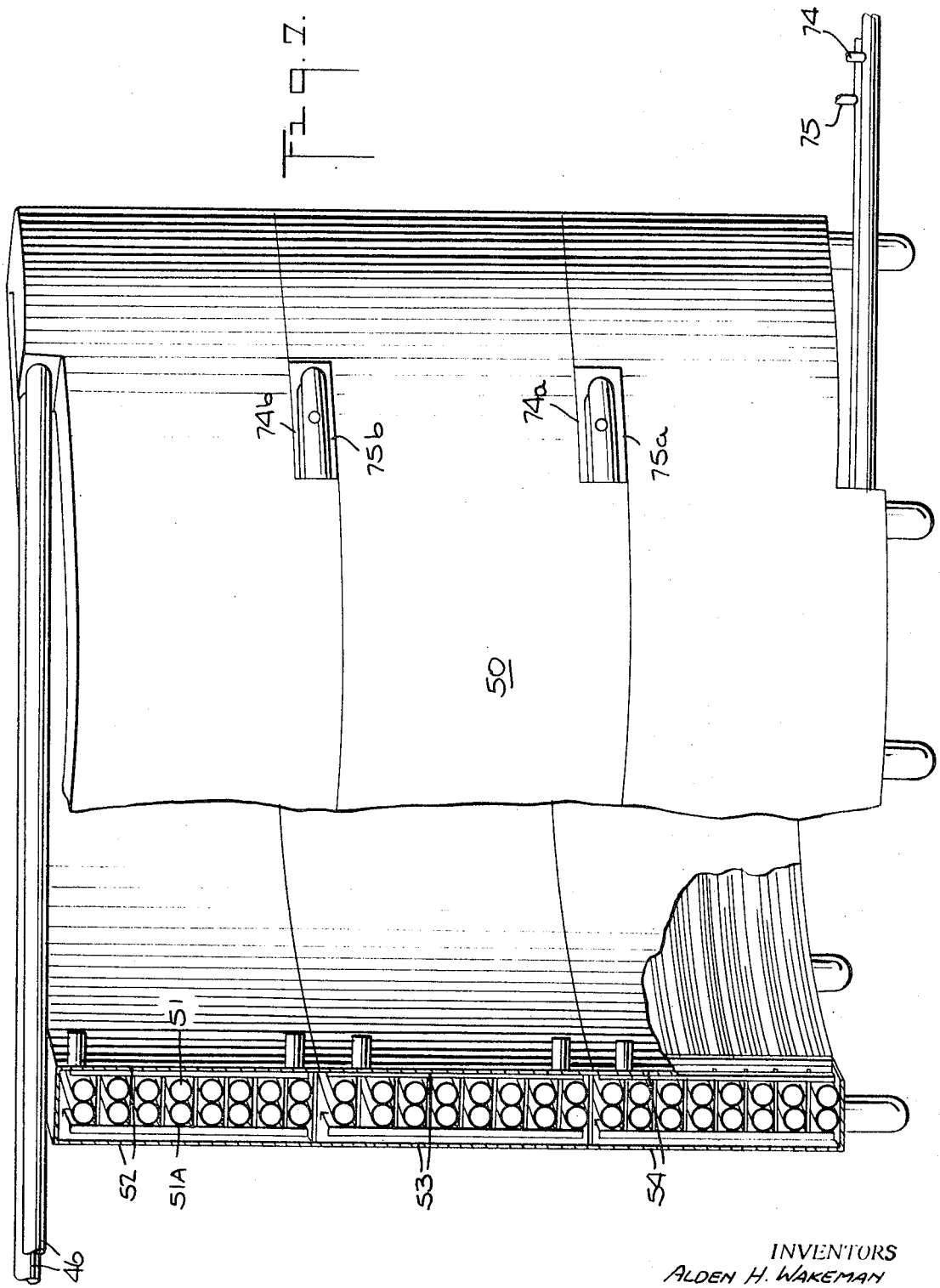

3,585,721
APPARATUS FOR THE PRODUCTION OF COTTAGE CHEESE
Alden Harvey Wakeman, Lake Mills, and Dan Crabill Roahen and Rodney Lee Knox, Fort Atkinson, Wis., assignors to St. Regis Paper Company, New York, N.Y.
Original application July 13, 1966, Ser. No. 564,951, now Patent No. 3,465,439, dated Sept. 9, 1969. Divided and this application Mar. 25, 1969, Ser. No. 832,520
Int. Cl. A01j 25/00
U.S. Cl. 31—46      11 Claims

ABSTRACT OF THE DISCLOSURE

A device for processing milk products in a continuous manner for the production of cheese and comprising a large surface heat exchanger through which the milk products pass while becoming coagulated at a particular acidity; and further comprising cutting means for cutting the emerging curd and means for treating the curd to produce cheese.

---

This application is a division of copending application Ser. No. 564,951 filed July 13, 1966, now Pat. No. 3,465,439 issued Sept. 9, 1969.

This invention relates to apparatus for the continuous manufacture of curd, including curd adaptable for the manufacture of cottage cheese and other cheese products; and for the treatment of curd for the continuous production of cottage cheese.

Heretofore, curd has been made in large vats by a batch method according to which a starter culture with or without rennet was first added to skim milk in the vat.

The batch method for making curd has a number of serious difficulties. Thus, the starting cultures often behave erratically resulting in abnormal flavors, nonuniform product, and lack of acid development; but perhaps the most serious disadvantage of the batch process is the fact that usually 10 to 12 hours are required to form and cook the curd, and when the curd is used to make cottage cheese, additional time is needed to condition the curd to produce cottage cheese.

We have conceived a novel apparatus by which the foregoing difficulties and disadvantages are overcome. Actually, our apparatus lends itself to the continuous production of curd by the process of Letters Patent No. 3,089,776 but which is not limited to that process, and which can treat the curd thus formed to produce cottage cheese. By means of our apparatus we are able to produce uniform curd and cottage cheese in a closed system thus preventing contamination, and in a time cycle of the order of one hour or less.

In essence our invention resides in apparatus for the continuous production of curd and cheese, comprising a curd former for the formation of curd and whey, fluid delivery means for delivery of milk to the curd former, a cooker or processor arranged for timed temperature treatment of curd, means delivering curd and whey from the curd former to the cooker, a conditioner for separating curd and whey and adjusting the solid content and if desired, other characteristics of the curd, and means delivering the curd and whey from the cooker to the conditioner.

As a feature of our invention, the curd former may take the form of a heat exchanger including a number of tubes into which the milk is delivered and in which coagulation takes place due to heating of the milk as it passes through the tubes. Thus, curd and whey are discharged continuously from the outlet end of the tubes. In the vicinity of the outlet end of the tubes, we provide means for reducing the curd to discrete particles. For this purpose, we prefer to employ rotating blades positioned at the tube ends to cut the rodlike curds into small slugs.

As already mentioned, our invention contemplates the treatment of the curd to produce cottage cheese and for this purpose we arrange in the cooker or processor a plurality of temperature treating zones whereby the curd and whey delivered to the processor from the former are successively treated therein. Actually, we prefer to change the temperature of the curd and whey incrementally and for controlled time periods to produce cottage cheese of the desired quality and consistency.

In order to maintain the curd suspended in the whey and to prevent matting of the curd as it advances from the former through the processor, we have found it desirable to induce agitation in the curd and whey and for this purpose we contribute means including a surge tank upstream of the processor and surge-inducing means such as a piston and cylinder downstream of the processor for moving whey into and out of the conduit of flowing curd and whey while maintaining the discharge of the curd and whey from the conduit constant. As an alternative, we provide means for injecting a quantity of whey periodically into the conduit by means of a pump.

Still a further feature of our invention contemplates a conditioner for separation of the curd and whey and for adjusting the solid content and acidity of the curd. For this purpose, we contribute means comprising a conveyor, perforated baskets carried by the conveyor and drive means for advancing the baskets in a closed circuit between a plurality of stations and for maintaining the basket at each station for a predetermined dwell time. The stream of curd and whey from the processor is delivered to the baskets at one of the stations, and as the baskets advance, the whey is drained off, and the curd is washed at least once and preferably, a number of times at subsequent stations, and means are provided for pressing the curd in the baskets after which it may be discharged for subsequent treatment such as creaming and packaging.

With reference to the conditioner, we also contemplate the provision of means for adjusting the pH of the curd at one of the stations, if necessary; and for agitating the curd during washing at at least one of the wash stations. Actually, the agitation may be accomplished by injecting into the curd intermittent blasts of fluid such as air or water.

By the term "milk" as used herein, we mean not only whole milk, but also modified milk such as skim milk or milk with higher than normal nonfat milk solids; in fact, we mean any mixture containing curd forming elements.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as to not depart from the spirit and scope of the invention.

A specific embodiment of the invention has been chosen for purposes of illustration and description, and is shown in the accompanying drawings, forming a part of the specification, wherein:

FIG. 1 is a schematic diagram of apparatus according to the present invention;

FIG. 2 illustrates a mixing tank and associated feed equipment for additives such as rennet and acid;

FIG. 3 is a vertical sectional view through the curd former;

FIG. 4 is a plane view of a pair of curd cutters;

FIG. 5 is a perspective view of a surge tank;

FIG. 6 is a sectional view of a ball check valve on the surge tank outlet;

FIG. 7 is an elevational view, partly broken away, of a processor;

FIG. 8 is an elevational schematic view of the conditioner illustrating a typical basket cycle;

FIG. 9 is a perspective view of a typical basket in which curd is conditioned;

Figure 12:
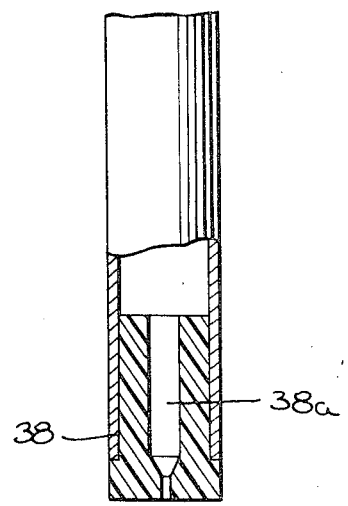
FIG. 12 is a detail view of the inlet end of the former tubes.

Referring now to the drawings, and particularly to FIG. 1 thereof, there is shown schematically apparatus for the continuous manufacture of cottage cheese, which apparatus includes a storage tank 20 for storing a supply of acidified milk for use in the manufacture of cheese and which, for example, may have about 16% total nonfat solids to which acid has been added to adjust the pH to about 4.56 to 4.58 and to which 10 ml. of rennet per 1000 lbs. of whole milk has been added. The milk in tank 20 may be held cool, at say about 40° F. by means of a refrigerated cooling jacket and an agitator keeps the milk in contonuous agitation. Such tanks are well known to the dairy industry and will not be described in detail here.

In the machine direction, the next basic unit is the curd former 21 followed by the processor 50 and conditioner 65; and a surge tank 45 is located between the curd former and processor, all for a purpose to be described.

The curd former is shown in detail in FIG. 3 and comprises vertical outer and inner shells 25 and 26, respectively, and lower and upper tube sheets 27 and 28, respectively, secured to the ends of the shells 25 and 26 to form a closed annular chamber in which a number of vertical, open-ended tubes 29, are positioned. These tubes may have any desired cross-section. In one instance the tubes are circular and have an inside diameter of the order of 5/16 inch. Their tube ends pierce the tube sheets and are welded or otherwise secured to them.

At the bottom of the curd former and communicating with the lower ends of the tubes 29, we provide an annular header 30 having an inlet opening 31, and we may position a baffle plate 30a in the header just below the tube ends. A trough 32 surrounds the top end of the shell 25 and communicates with the upper ends of the tubes 29 beneath an inverted dished cover 32a.

A header 35 delivers heating fluid such as steam from inlet 38 to radiating pipes 36 at a flow rate controlled by valve 39 (FIG. 1) and valve control 40 which may control the valve according to vacuum, temperature or the temperature of curd and whey emerging from tubes 29. The radiating pipes 36 communicate with the space between the shells 25 and 26, and a vacuum connection 37 also communicates with the space between the shells. The vacuum may be provided by condenser action of the curd former and non-condensibles are withdrawn by well known means (not shown). Immediately adjacent the upper ends of the tubes 29, we illustrate a pair of cutter blades 33 which are caused to rotate by a motor 34.

Milk from conduit 22 enters the inlet header 30 through connection 31 and moves upwardly through the tubes 29 in which it is heated by the fluid between shells 25 and 26, to a temperature which causes coagulation of the curd at its adjusted acidity. Thus, curd surrounded by whey emerges continuously from the tops of the tubes 29 in rod-like form. As it emerges, the curd is immediately cut into short lengths by the rotating blades 33 which, as shown in FIG. 4, are inclined to the direction of the radius of rotation thus to push the curd particles out into the trough 32. We prefer to chill the tube sheet 27 to prevent the formation of curd thereon, and for this purpose, we provide water inlet 41 and outlet 42 whereby sheet 27 is covered with cool water.

A line 43 is provided to admit whey at a controlled temperature of about 40° F. to the trough 32 to blend with the curd and whey issuing from the tubes 29, the blend then leaving the trough 32 through lines 44 at 80 to 90° F.

We have found that occasionally flow through individual tubes 29 will be erratic and may even become plugged. To obviate this condition and maintain uniform flow through the tubes, there is provided a pressure plug 38 formed with a longitudinal bore 38a with a reduced entrance, as shown in FIG. 12. This plug is preferably formed of Teflon and, fit snugly into the inlet end of the tubes 29. By way of example, where the tubes 29 are 5/16 inch in diameter, the plug bore may have a .031 inch diameter entrance to provide a one to two pound pressure drop where the milk flows at a rate of about 20 gals. per minute. This pressure drop at the tube entrances has been found effective to assure continuous uniform flow of milk and curd through the tubes.

Turning now to FIG. 5, it will be seen that the lines 44 communicate with the surge tank 45 near its top and, as shown, the curd and whey is drawn from the bottom of the tank 45 by syphoning action through tubes 46. An agitator 46a, driven by motor 46b, keeps the curd and whey in uniform suspension in the tank; and cool water is sprayed into the tank above the liquid level to settle any foam in the tank.

FIG. 6 illustrates a ballcheck valve 47 mounted on the tubes 46 to permit the escape of any air from the system.

The tubes 46 deliver the curd and whey from the surge tank to the processor 50 illustrated in FIGS. 1 and 7. The processor comprises three vertically stacked cooking zones each formed of spiral coils 51, 51a encased in sheet metal jackets 52, 53 and 54, respectively, and each adapted to permit a heating or cooling fluid to circulate over the coils, whereby accurate control of temperature and time is possible in each zone. Thus, for example, in the first or upper zone 52, we may maintain the curd and whey at about 80 to 90° F.; in zone 53 the blend may be raised to about 125° F.; and in lower or final zone 54 the blend may be heated to about 145° F. Pumps 55 (FIG. 1) circulate heating or cooling fluid through the respective zones and temperature-sensing valve controllers 57 control fluid valves 60 to maintain the desired temperature in the respective zones.

The curd and whey, thus treated in the processor 50 are delivered through lines 74 and 75 to the conditioner 65; but it will first be noted that we have provided for the injection, if desired, into the blend at various points in the device of additional whey or other material. To this end, we have provided access openings in the outer shell of the processor 50 between the first and second and the second and third zones thereof. These openings expose fittings in the blend lines to which injection means may be connected.

The conditioner, illustrated in FIGS. 1 and 8, has a tray 79 at its entrance into which the blend of curd and whey from the processor is discharged. Baskets 80 are carried by a chain in parallel excursions of a continuous circuit to the rear of the conditioner (to the right as viewed in FIG. 8) along a lower run, and back to the entrance end, along an upper run. A drive and indexing mechanism 81 advance the baskets from station to station.

Thus, in the first station, slightly to the right and below tray 79, end gate 82 on tray 79 swings open to permit a quantity of blend from the cooker to discharge into the basket while whey pan 83 is in the raised position. The baskets, shown in detail in FIG. 9, are perforated so that with the whey pan 83 raised, the whey is maintained in the basket to keep the curd in suspension wherefore it will not break up.

The illustrated conditioner is divided by a partition 85 into a whey section 84 and a wash section, the latter including eight basket stations with wash tanks 86 shown in raised position in FIG. 8. A frame 87 carries headers 88, each having a number of drop tubes 89 shown extending down into the baskets. This frame 87 can be raised by arms 90 to lift the tubes 89 out of the baskets so that with the wash tanks lowered and tubes 89 raised, baskets 80 may be moved to the next station.

After the tray 79 has emptied, the whey pan 83 and wash tanks 86 are lowered and whey or wash water, as the case may be, drains from the baskets through the perforations therein as the baskets are indexed to the next station.

As the wash tanks are raised, the remaining water floods the baskets and drop tubes 89 are simultaneously lowered into the baskets for the injection of air or water to agitate and wash the curd, thus to prevent matting. The tanks 86 may be filled with flowing wash water in any desired manner. The wash water in the first four wash stations may be, for example, at 90° to 100° F.; stations five and six may supply wash water at about 70° to 80° F.; and wash stations seven and eight at about 32° to 40° F. Additional water at about 32° to 40° F. may be sprayed through nozzles 92 at desired stations to eliminate foam and for further washing, cooling and control of total solids of the end product. It will be understood that fewer or more wash stations may be provided and that drain stations may be included if desired between the wash stations. By gradually reducing the water temperature, thermal shock of the curd is avoided, and the final wash water may be acidified as desired to adjust the acidity of the curd. An extended drain period is provide by the thirteen stations between the last wash and dumping stations. The apparatus provides great flexibility for modifying treatments to attain the desired end product.

As indicated at 92a, an arcuate member may be pushed down into the basket at a given station void of wash water to squeeze the curd for further water and whey removal.

At the dumping station, the baskets are inverted and their contents dumped onto a discharge conveyor 95 which carries the curd from the conditioner ready for creaming and packaging. A perforated pipe 96 positioned around the inverted basket blasts air against the basket to assure complete discharge of the curd.

The basket speed is adjustable, but we have found that about 40 seconds for each position is a practical period which gives a total residence in the conditioner of about 17 minutes.

It will be recalled that whey may be injected into the curd former 21, and of course this whey is taken from the whey tank formed by partition 85 of the conditioner. Thus, as shown in FIG. 1, whey from the conditioner is drawn by pump 96 through lines 97 and 98 to a heat exchanger 99, which may be of the type shown in U.S. Pat. No. 2,790,627, and through pipe 43 and valve 49 under the control of a temperature-sensing valve controller 48, which may react to surge tank temperature, and thence to the curd former.

As has been mentioned, it is desirable to maintain the curd suspended in the whey and to prevent matting of the curd as it advances from the former through the cooker, and we agitate the curd-whey blend to obtain the desired results. For this purpose, we may provide pumps 63 and 64 (FIG. 1) connected to the outlets of coils 51 and 51a to meter the blend to the conditioner. These pumps are driven by variable speed drives 66 and 67 to control the pump flow rate. A centrifugal pump 68 takes whey from the whey tank of the conditioner through line 69 and delivers it through line 70 to three-way valve 71 which, by the action of pneumatic cylinders 72 and a reversing timer 73 alternately sets valve 71 to discharge through line 74 to coil 51 and line 75 to coil 51a causing periodic flow surges.

We have mentioned that alternative surge means may be used, and in this connection we may provide means for periodically injecting a quantity of whey into any desired locations of the blend conduit by means of a return pump fed from the whey tank of the conditioner. These periodic injections would occur while the discharge of curd and whey from the conduit was kept constant so as to induce a reverse surge in the conduit.

At tank 20, we may use apparatus for continuously mixing milk and additives. Thus, in FIG. 2, we illustrate a mixing chamber 102 into which milk can enter through line 104. A metering pump 105 supplies acid through line 106 and rennet is metered into the chamber 102 through pump 107. An agitator 109 extends into the chamber and pump 23 supplies the chamber contents to the curd former 21 through line 22.

It will be understood that the values referred to in the foregoing example are illustrative only, and that those persons skilled in the art will be readily able to vary them depending upon the characteristics desired in the end product.

Figure 10:
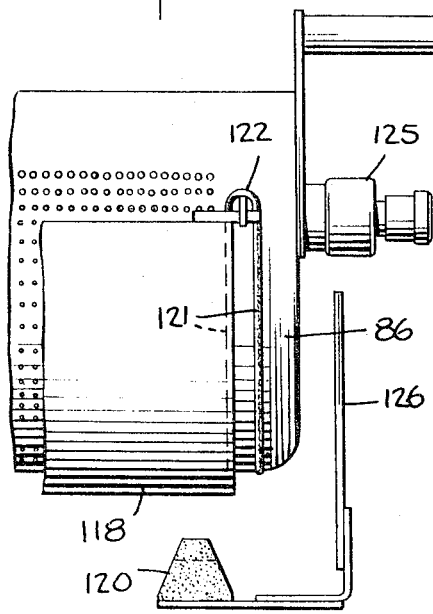
FIG. 10 is a partial elevational view of a basket assembly for use in the conditioner.
Figure 11:
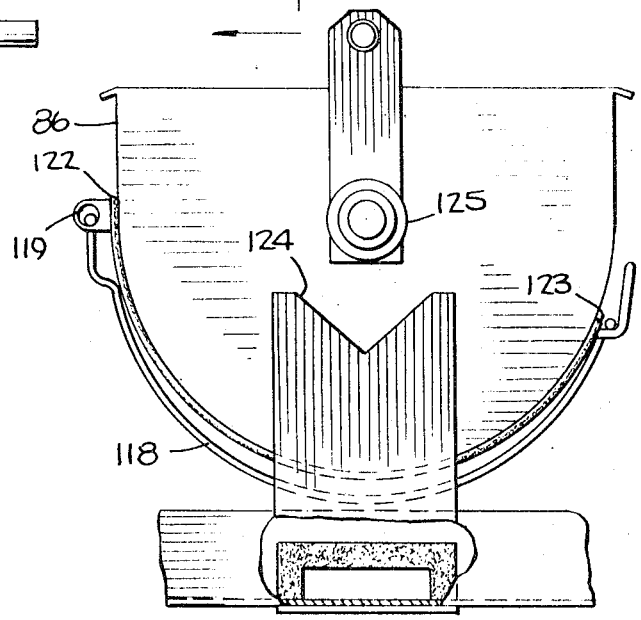
FIG. 11 is an end view of the assembly of FIG. 10.

FIGS. 10 and 11 illustrate a modified basket assembly in which wash tanks 86 are replaced by covers 118 which are attached at one side by hinges 119 to baskets 86. Lifters 120 may be raised against the bottom of the covers 118 by a mechanism, not shown, to swing the covers into close proximity with the perforated portions of the baskets. Gaskets 121 are provided at each end of the covers so as to seal off the end gaps when the covers are in the up position as they will be during the wash portion of the cycle so that the wash water fills the baskets to the top of the covers and overflows, thereby flooding the baskets and permitting the curd to be agitated in the water by air from the drop tubes 89. The gasket 121 is a closed loop which is doubled over at points 122 and 123 and is stretched as the cover is raised. A basket 126 having V notch 124 at its top is attached to the lifters 120. When the latter are raised, the V notch 124 engages basket support 125 and slightly raises the basket thereby serving accurately to center the basket over the lifter. Wash water through lines 91, 92 and 93 instead of entering the wash tanks as previously described may now be sprayed over the top of the baskets. To initiate the drain portion of the cycle the lifters 120 are lowered so that the covers 118 swing away from the baskets 86 enabling the water to drain through the basket perforations.

In the above description, whey is blended with the main stream of curd and whey at various points in the apparatus. Whey has the advantage of availability and it is a natural environment for curd. The whey additions serve the purposes of temperature adjustment, agitation and as a carrier fluid. It should be understood that some other fluid compatible with the curd such as water, acidified water, brine, steam and air may be substituted.

From the foregoing description, it will be seen that we contribute novel apparatus for the continuous production of uniform curd, and which can continuously treat the curd thus produced, or curd produced by other means, to make cheese. By reason of the fact that our apparatus can produce curd and cheese continuously, we are able to reduce the total time cycle from between 10 to 12 hours to a cycle of the order of one hour or less. It will also be seen that our apparatus is a closed system so that all processes take place in a sanitary manner, that it occupies a relatively small amount of space and is operable by a comparatively small labor force since it is fully automatic.

We claim:

1. In apparatus for the continuous production of curd, an elongated shell and tube heat exchanger having spaced tube sheets and a series of tubes extending therebetween, means delivering a supply of cold milk to one end of said tubes, means heating the tubes to warm the milk therein to curd forming temperature whereby rodlike lengths of curd are discharged along with whey from the other end of said tubes.

2. Apparatus according to claim 1, further characterized in that means are provided for cooling the tube sheet at the inlet end of said tubes to prevent formation of curd thereon.

3. Apparatus according to claim 1, further characterized in that means are provided at the discharge end of the tubes for blending additional whey with the curd and whey issuing therefrom.

4. In apparatus for the continuous production of curd, a shell and tube heat exchanger having spaced tube sheets and a series of tubes extending therebetween, means delivering a supply of cold milk to one end of said tubes, means heating the tubes to warm the milk therein to curd forming temperature whereby rodlike lengths of curd are discharged along with whey from the other end of said tubes, and means being provided at the discharge end of said tube for cutting the rodlike lengths of curd into discrete particles.

5. In apparatus for the continuous production of cheese curd, a shell and tube heat exchanger having spaced tube sheets and a series of tubes extending therebetween, means delivering a supply of cold milk to one end of said tubes, a plug in the entrance of each tube formed with a through bore to establish a predetermined pressure drop in the milk entering said tubes, means heating the tubes to warm the milk therein to curd forming temperature whereby rodlike lengths of curd are discharged along with uncoagulated whey from the other end of said tubes.

6. In apparatus for the continuous production of cheese curd, a heat exchanger comprising an elongated vertically disposed outer shell and a spaced elongated vertically disposed inner shell, lower and upper tube sheets secured to the ends of said shells, respectively, to form a closed elongated anular chamber, a plurality of vertically disposed open ended tubes mounted in said chamber, said tubes having ends which pierce said tube sheets and which are connected thereto respectively, a first annular header mounted in communication with the lower ends of said tubes, an inlet opening for said first header, means communicating with the upper ends of said tubes for collecting the flow of whey and curd particles, outlet means for said last named means, means for passing heated fluid through said elongated chamber, and valve means for controlling the flow of said heating fluid.

7. Apparatus according to claim 6, wherein said tubes have an inside diameter of the order of about 5/16 inch.

8. Apparatus according to claim 6, further comprising a baffle plate mounted in said first annular header adjacent the tube ends.

9. Apparatus according to claim 6, wherein said means for communicating with the upper ends of said tubes for collecting the flow of whey and curd porticles comprises a trough surrounding the top end of said outer shell and communicating with the upper ends of said tubes, an inverted dish-like cover mounted over said trough to form a closure.

10. Apparatus according to claim 6, wherein said means for passing heating fluid through said elongated chamber and the means for controlling the flow of said heating fluid comprise a second header surrounding said outer shell, an inlet for said second header for receiving heating fluid, a plurality of radially extending pipes interconnecting said second header with said elongated chamber, outlet means for said elongated chamber, valve means for controlling the flow of said heating fluid.

11. In apparatus for the continuous production of cheese curd, a heat exchanger comprising an elongated vertically disposed outer shell and a spaced elongated vertically disposed concentric inner shell, lower and upper tube sheets secured to the ends of said shells, repsectively, to form a closed elongated annular chamber, a plurality of vertically disposed open ended tubes mounted in said chamber, said tubes having ends which pierce said tube sheets and which are connected thereto, respectively, a first annular header mounted in communication with the lower ends of said tubes, an inlet opening for said first header, a trough surrounding the top end of said outer shell and communicating with the upper ends of said tubes, an inverted dish-shape cover mounted over said trough to form a closure, outlet means for said closure, a second annular header surrounding said outer shell, an inlet for said second annular header for receiving heating fluid, a plurality of radially disposed pipes interconnectin said second header with said elongated annular chamber, outlet means for said chamber, valve means for controlling the flow of said heating fluid, and a pair of cutter blades mounted for rotation adjacent the upper ends of said tubes.

References Cited

UNITED STATES PATENTS

| | | | |
|---|---|---|---|
| 2,781,269 | 2/1957 | Harper et al. | 31—89X |
| 2,851,363 | 9/1958 | Kielsmeier | 99—116 |
| 2,908,575 | 10/1959 | Spiess, Jr. et al. | 31—46X |
| 2,917,827 | 12/1959 | Lankford | 31—46 |
| 3,210,845 | 10/1965 | Radema et al. | 31—46 |

HUGH R. CHAMBLEE, Primary Examiner